US009101885B2

(12) United States Patent
Chen et al.

(10) Patent No.: US 9,101,885 B2
(45) Date of Patent: Aug. 11, 2015

(54) SILICA-LIKE MEMBRANE FOR SEPARATING GAS AND THE METHOD FOR FORMING THE SAME

(71) Applicant: CHUNG YUAN CHRISTIAN UNIVERSITY, Tao-Yuan (TW)

(72) Inventors: Jung-Tsai Chen, Taoyuan County (TW); Ywu-Jang Fu, Taoyuan County (TW); Kuo-Lun Tung, Taipei (TW); Shu-Hsien Huang, Yilan County (TW); Wei-Song Hung, Taoyuan County (TW); Shingjiang Jessie Lue, Taoyuan County (TW); Chien-Chieh Hu, Taoyuan County (TW); Kueir-Rarn Lee, Taoyuan County (TW); Juin-Yih Lai, Taoyuan County (TW)

(73) Assignee: CHUNG-YUAN CHRISTIAN UNIVERSITY, Tao-Yuan (TW)

( * ) Notice: Subject to any disclaimer, the term of this patent is extended or adjusted under 35 U.S.C. 154(b) by 216 days.

(21) Appl. No.: 13/690,331

(22) Filed: Nov. 30, 2012

(65) Prior Publication Data
US 2014/0144323 A1    May 29, 2014

(30) Foreign Application Priority Data

Nov. 23, 2012    (TW) .............................. 101143912 A

(51) Int. Cl.
*B01D 53/22*    (2006.01)
*B01D 71/70*    (2006.01)
*B01D 67/00*    (2006.01)

(52) U.S. Cl.
CPC .............. *B01D 71/70* (2013.01); *B01D 53/228* (2013.01); *B01D 67/0006* (2013.01); *B01D 53/22* (2013.01); *B01D 2256/12* (2013.01); *B01D 2257/504* (2013.01); *B01D 2258/0283* (2013.01); *B01D 2323/30* (2013.01); *B01D 2323/40* (2013.01); *B01D 2323/42* (2013.01); *B01D 2325/04* (2013.01); *Y02C 10/10* (2013.01)

(58) Field of Classification Search
CPC ...... B01D 53/22; B01D 53/228; B01D 69/10; B01D 69/12; B01D 69/125; B01D 67/0006; B01D 63/22; B01D 71/70; B01D 2256/12; B01D 2257/504; B01D 2258/0283; B01D 2323/30; B01D 2323/40; B01D 2323/42; B01D 2325/04; Y02C 10/10
USPC ............................................................ 96/12
See application file for complete search history.

(56) References Cited

U.S. PATENT DOCUMENTS

| | | | | |
|---|---|---|---|---|
| 4,244,856 A | * | 1/1981 | Hatanaka et al. | 524/424 |
| 4,987,202 A | * | 1/1991 | Zeigler | 528/10 |
| 5,087,719 A | * | 2/1992 | Tilley et al. | 556/430 |
| 5,993,515 A | * | 11/1999 | Sirkar | 95/46 |
| 5,994,454 A | * | 11/1999 | Chung et al. | 524/731 |
| 6,355,092 B1 | * | 3/2002 | Jansen et al. | 95/45 |
| 6,489,407 B1 | * | 12/2002 | Clark et al. | 525/478 |

(Continued)

*Primary Examiner* — Jason M Greene
*Assistant Examiner* — Anthony Shumate
(74) *Attorney, Agent, or Firm* — WPAT, PC; Justin King

(57) ABSTRACT

The present invention discloses a silica-like membrane for separating gas, which is modified from poly(dimethylsiloxane) (PDMS) membrane by an atmospheric pressure high temperature plasma torch (APHTPT). Furthermore, the present invention of the separating gas silica-like membrane with an inorganic/organic interface structure which has both the gas flux of the organic membrane and also the gas selectivity of the inorganic membrane.

11 Claims, 6 Drawing Sheets

(56) References Cited

U.S. PATENT DOCUMENTS

| | | | |
|---|---|---|---|
| 7,015,296 B2* | 3/2006 | Nakayama et al. | 528/14 |
| 7,166,148 B2* | 1/2007 | Lyons et al. | 95/54 |
| 7,531,120 B2* | 5/2009 | Van Rijn et al. | 264/299 |
| 2003/0144449 A1* | 7/2003 | Nakayama et al. | 528/10 |
| 2004/0028875 A1* | 2/2004 | Van Rijn et al. | 428/98 |
| 2006/0063012 A1* | 3/2006 | Shin et al. | 428/447 |
| 2007/0082147 A1* | 4/2007 | Teranishi et al. | 428/32.66 |
| 2007/0249875 A1* | 10/2007 | Fujiki et al. | 570/126 |
| 2010/0181253 A1* | 7/2010 | Vandezande et al. | 210/650 |
| 2011/0048947 A1* | 3/2011 | Petronis et al. | 204/483 |
| 2011/0223484 A1* | 9/2011 | Korgel et al. | 429/231.5 |
| 2012/0058302 A1* | 3/2012 | Eggenspieler et al. | 428/141 |
| 2012/0231518 A1* | 9/2012 | Cai | 435/180 |
| 2013/0253109 A1* | 9/2013 | Monden | 524/161 |
| 2014/0011969 A1* | 1/2014 | Panchapakesan | 525/476 |

* cited by examiner

| Membrane | Chemical composition | | |
|---|---|---|---|
| | 101.9 eV-SiO$_2$C$_2$ (%) | 102.8 eV-SiO$_3$C$_2$ (%) | 103.6 eV-SiO$_4$ (%) |
| Pristine | 100 | 0 | 0 |
| 07PDMS | 77 | 23 | 0 |
| 10PDMS | 8 | 22 | 70 |
| 12PDMS | 0 | 36 | 64 |
| 15PDMS | 0 | 10 | 90 |

Table 1

FIG.10

SILICA-LIKE MEMBRANE FOR SEPARATING GAS AND THE METHOD FOR FORMING THE SAME

BACKGROUND OF THE INVENTION

1. Field of the Invention

The present invention relates to a membrane for separating gas, and more particularly, to a silica-like membrane for separating gas, and a method for forming.

2. Description of the Prior Art

Today, due to the trend of globalization, environmental issues constantly rise. Especially in the industry, carbon rights issues related to their research have been continuously discussed. Hence, in future industry trends, exhaust gas recycling or separation is in strong demand. In current industrial utility, the gas separation process has been applied in a wide variety of separation processes. In particular, the applications purifying $O_2$ process from air, as the combustion process of carbon dioxide or oxy-fuel in the pre-combustion and post-combustion, which is more vigorously using a gas separation membrane. Using a thin-membrane separation process has a number of advantages which are: low cost, low energy consumption, and easy to operate.

In addition, a polymer membrane has advantages which are the excellent characteristics for forming the membrane, the excellent homogeneity, high regeneration, and simple preparation methods. Thus it is widely used in the development of a gas separation membrane. However, it has a poor effect for the selectivity and the gas flux for the polymer membrane in a large number of gas treatments, and thus it cannot be applied to a large number of treatments for industrial gas separation.

In the prior conventional art, there are two methods for the development of the gas separation membrane, one is a high throughput, low selection ratio, and the other is low throughput, high selection ratio. Thus, a porous inorganic membrane having a molecular sieve mechanism has been used in the gas separation procedures. It causes concern to the industry, which can provide better gas separating properties, which can be compared with the polymer membrane. Silica membrane is based on a single layer, porous inorganic membrane, having high permeability and high selectivity, but inorganic characteristics make the physical properties of the silica membrane to be brittle, and the process is complex and difficult to prepare. It is manufactured by the following universal methodologies: chemical vapor deposition (CVD) and sol-gel. Chemical vapor deposition (CVD) can be used to prepare uniform and ultrathin silica membrane, but it contains a number of steps, and thus the production cost is expensive; while the sol-gel (sol-gel) is a relatively low-cost manufacturing process, but the homogeneity of the silica membrane is poor. In order to improve the uniformity, it is repeated to coat a sol-gel on the substrate and calcine the substrate repeatedly; however, this procedure is very time-consuming.

Another low-cost approach to prepare a silica membrane is the oxidative thermolysis for a precursor of a rubbery membrane of polydimethylsiloxane (PDMS). In addition, there is another way to decompose a copolymer material at high temperatures, such as a precursor polyimide-PDMS to manufacture the microporous carbon-silica membrane for separating gas.

However, all the preparation methods described above, most of them are used with a pyrolysis technology in a high-temperature oven. It is time-consuming and expensive. Furthermore, there is another previous technology for reforming the membrane for separating gas by ultraviolet (UV), the selectivity of the membrane is improved. However, this method has a fairly lengthy preparation process, and limits the size for their preparation, so a large area cannot be formed at a time. Hence, it must be a single small region to form. Therefore, its manufacturing process is very time consuming.

Accordingly, the development of a low-cost, high selectivity, and high-throughput gas separation membrane is the major target which is being desperately developed in the industry.

SUMMARY OF THE INVENTION

In view of the above background and special requirements of the industry, the present invention provides a silica-like membrane for separating gas, and the method for forming membrane for separating gas, which address the issues that are not yet solved in the prior art.

An objective of the present invention is to provide a membrane of polysilane by an atmospheric pressure high temperature plasma torch (APHTPT) to form a membrane of a silica-like structure of a polydimethylsiloxane(PDMS) for separating gas. It takes less than the short time of 2 minutes by the atmospheric pressure high temperature plasma torch (APHTPT), while simultaneously active and decompose a surface of the membrane of polydimethylsiloxane(PDMS) at high temperature. Accordingly, the present invention can achieve process requirements which are low cost, low working hours, low energy consumption, a large area formed once and so on, in order to form a membrane for separating gas with good uniformity, high throughput, and high selectivity of a large area.

According to the above objectives of the present invention, the present invention provides a silica-like membrane for separating gas, comprising a breathable layer with crosslink structure; and a selecting layer with silica-like structure. The thickness of said selecting layer is a derived ratio from said breathable layer by a plasma polymerization process. The selecting layer is proportional to the plasma energy, wherein said plasma energy is 7 kW~15 kW. The material of said breathable layer is a polysilane. The polysilane further comprises a polydimethylsiloxane(PDMS). The breathable layer comprises $SiO_2C_2$ and/or siloxane group. The selecting layer comprises $SiO_3C_2$ and $SiO_x$.

According to the above objectives of the present invention, the present invention provides a method for forming a silica-like membrane for separating gas, comprised of providing a membrane of polysilane; and performing a plasma polymerization process on the surface of said membrane of polysilane to form said silica-like membrane, wherein the silica-like membrane comprises a breathable layer with a crosslink structure and a selecting layer with silica-like structure, said selecting layer is derived ratio from said breathable layer by said plasma polymerization process. The thickness of said selecting layer is proportional to said plasma energy, wherein said plasma energy is 7 kW~15 kW. The modified surface of the polysilane membrane 145 separated by a work distance d said plasma polymerization process is performed by an atmospheric pressure high temperature plasma torch (APHTPT). The modified surface of the polysilane membrane is separated with the gunpoint of the atmospheric pressure high temperature plasma torch (APHTPT) by a work distance which is about 5~15 cm. The gunpoint of the atmospheric pressure high temperature plasma torch (APHTPT) scans the surface of the polysilane membrane with a rate, which is 5 cm/sec to 15 cm/sec. The polysilane further comprises a polydimethylsiloxane(PDMS). The breathable layer comprises $SiO_2C_2$ and/or siloxane group. The selecting layer comprises $SiO_3C_2$ and $SiO_x$.

According to the above objectives of the present invention, the present invention provides a method for forming a silica-like membrane for separating gas, comprised of forming a membrane of polysilane; and performing a plasma polymerization process on the surface of said membrane of polysilane to form said silica-like membrane, wherein the silica-like membrane comprises a breathable layer with a crosslink structure and a selecting layer with silica-like structure, said selecting layer is a derived ratio from said breathable layer by said plasma polymerization process. The method for forming a silica-like membrane of claim 16, further comprising: providing a feed with the structure of said polysilane; performing a pre-polymerization process to form a pre-polymer from said feed with the structure of said polysilane by a cross-linking agent and a catalyst; performing a coating process to form a coating membrane of said pre-polymer with said polysilane; and performing a first polymerization process for said coating membrane to form said membrane of polysilane. The feed with the structure of said polysilane is selected from the following lists, either as single one, its derivative, or any combinations thereof: POLYSILOXANE, POLYCARBOSILANE. The polysilane is a polydimethylsiloxane(PDMS) The cross-linking agent is selected from the following lists, either as single one, its derivative, or any combinations thereof: 1,3,5-trimethyltrivinylcyclotrisiloxane, Tetramethyltetravinylcyclotetrasiloxane, Decamethylcyclopentasiloxane, 2,4,6,8-tetramethylcyclotetrasiloxane, wherein the crosslinking agent content is about 1~30 PHR (parts per hundred of Rubber). The catalyst further comprises a titanium-2-ethylhexoxide or its derivative, and said catalyst content of approximately 0.1~1 PHR (parts per hundred of Rubber). The plasma polymerization process further comprises an atmospheric pressure high temperature plasma torch (APHTPT), wherein said modified surface of the polysilane membrane is separated with the gunpoint of the atmospheric pressure high temperature plasma torch (APHTPT) by a work distance. The work distance which is about 5~15 cm, and a plasma energy of said atmospheric pressure high temperature plasma torch (APHTPT) is from 7 to 15 kW, and a scan rate of said atmospheric pressure high temperature plasma torch (APHTPT) is about 5~15 cm/sec. The breathable layer comprises $SiO_2C_2$ and/or siloxane group. The selecting layer comprises $SiO_3C_2$ and $SiO_x$.

Figure 1:
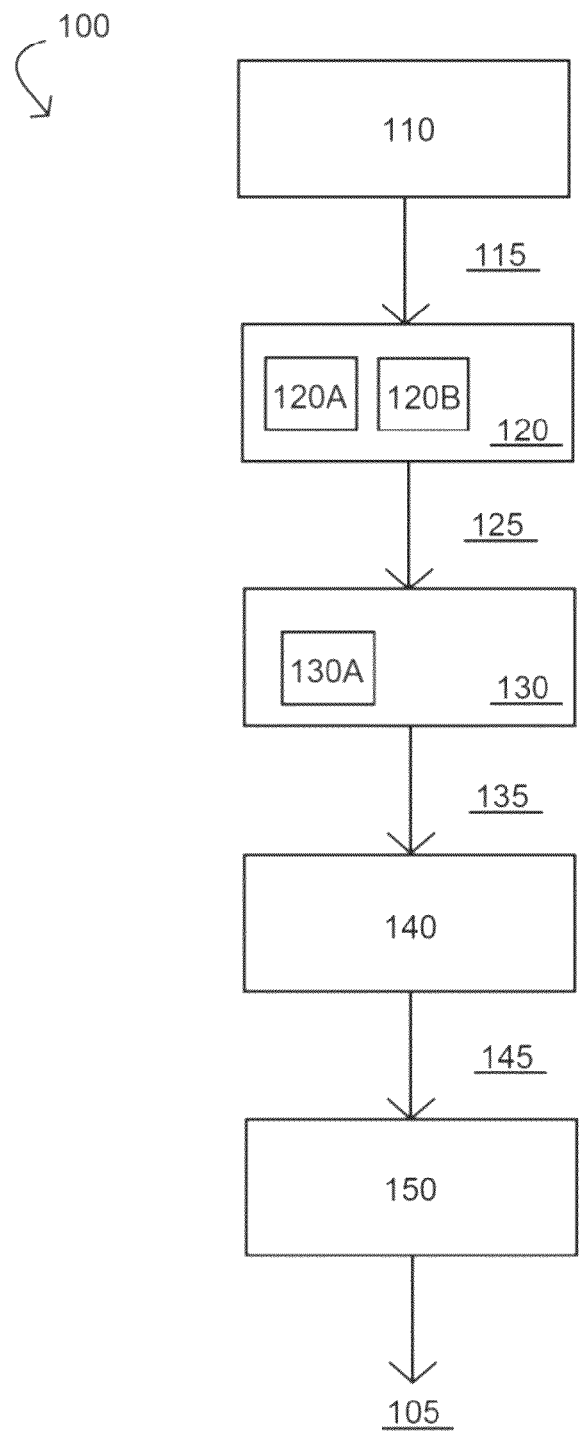
FIG. 1 shows a silica-like membrane for separating gas and the method for forming it according to a first embodiment of the present invention.

TABLE 1 (FIG. 10) shows the Si2p deconvoluted data for PDMS membranes.

DETAILED DESCRIPTION OF THE PREFERRED EMBODIMENTS

The present invention is directed to a membrane for separating gas. In order to facilitate understanding of the present invention, detailed structures and their elements and method steps are set forth in the following descriptions. Obviously, the implementations of the present invention are not limited to specific details known to those skilled in the art of a membrane for separating gas. On the other hand, well-known structures and their elements are omitted herein to avoid unnecessary limitations on the present invention. In addition, for better understanding and clarity of the description by those skilled in the art, some components in the drawings may not necessary be drawn to scale, in which some may be exaggerated relative to others, and irrelevant parts are omitted. Preferred embodiments of the present invention are described in details below, in addition to these descriptions, the present invention can be widely applicable to other embodiments, and the scope of the present invention is not limited by such, rather by the scope of the following claims.

Figure 2:
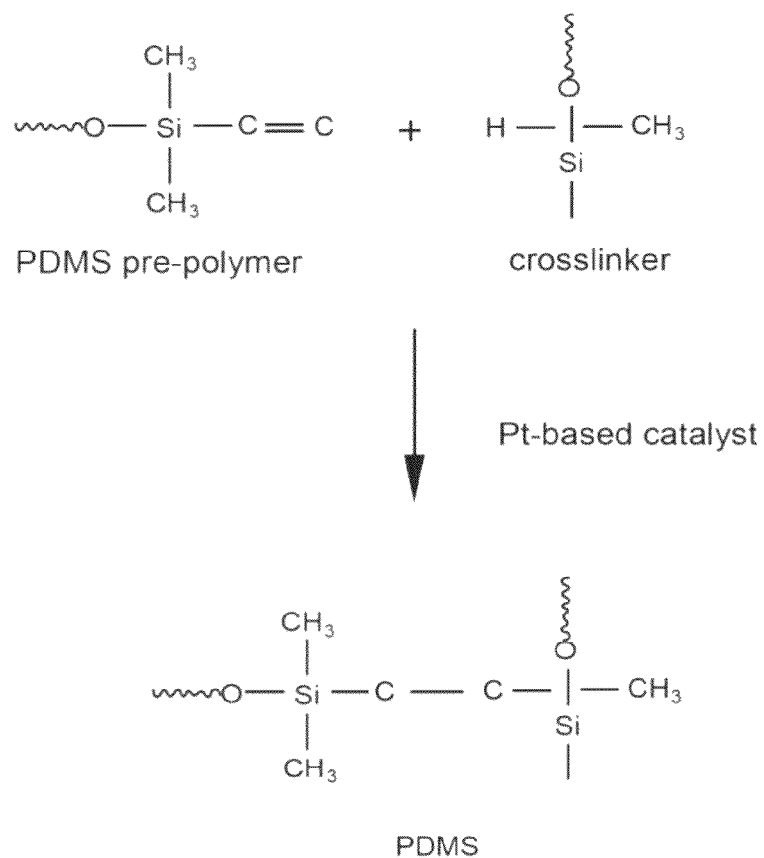
FIG. 2 shows a pre-polymer of polymerization according to a first embodiment of the present invention.

According to a first embodiment of the present invention, refer to FIGS. 1 and 2, a method 100 for forming a silica-like membrane 105 is provided. First, a feed with the structure of the polysilane 115 is provided. The feed with the structure of the polysilane 115 is selected from the following lists, either as single one, its derivative, or any combinations thereof: polydimethylsiloxane(PDMS), POLYSILOXANE, POLYCARBOSILANE. Then, a pre-polymerization process 120 is used to form a pre-polymer 125 from the feed with the structure of the polysilane 115 by a cross-linking agent and a catalyst, the cross-linking agent is selected from the following lists, either as single one, its derivative, or any combinations thereof: 1,3,5-trimethyltrivinylcyclotrisiloxane, Tetramethyltetravinylcyclotetrasiloxane, Decamethylcyclopentasiloxane, 2,4,6,8-tetramethylcyclotetrasiloxane. And the catalyst is titanium-2-ethylhexoxide. In addition, the pre-polymerization process 120 further comprises a uniform blended step 120A and a degassing step 120B. After, a coating process 130 is to coat the pre-polymer 125 into a coating membrane 135, the thickness of the coating membrane 135 is approximately 400 μm, wherein the coating process 130 further comprises a knife coating step 130A. Subsequently, a first polymerization process 140 is used to form a polysilane membrane 145, the thickness of the polysilane membrane 145 is about 200 to 400 μm, preferably about 400 μm, wherein the first polymerization temperature of the first polymerization process 140 is about 100 to 160° C., preferably about 120° C., and the first polymerization time is about 10 to 30 minutes, preferably about 15 minutes.

Figure 3:
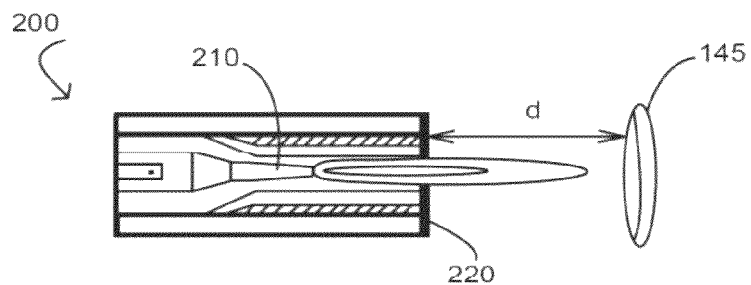
FIG. 3 shows a plasma polymerization process according to a second embodiment of the present invention.

According to a first embodiment of the present invention, refer to FIGS. 1 and 3, a plasma polymerization process 150 is provided for forming a silica-like membrane 105. The plasma polymerization process 150 by an atmospheric pressure high temperature plasma torch (APHTPT) 200, wherein, the atmospheric pressure high temperature plasma torch (APHTPT) 200 may generate an arc between the cathode 210 and the anode 220, when the plasma stream, such as argon, nitrogen, helium, hydrogen, through the arc, the electrons be accelerated to collide the plasma gas. Thus it may intensify the plasma gas into ionization, and the plasma gas from the atmospheric pressure high temperature plasma torch (APHTPT) 200 emitted to modify the surface layer of the polysilane membrane 145 to form the silica-like membrane 105. The surface of the polysilane membrane 145 is separated with the gunpoint of the atmospheric pressure high temperature plasma torch (APHTPT) 200 by a work distance d, the working distance d is about 5~15 cm, more preferably of about 10 cm. In addition, the above plasma energy was applied in the range of 7 to 15 kW, preferably of approximately 10 kW; and the atmospheric pressure high temperature plasma torch (APHTPT) 200 was scanned the surface of the polysilane membrane 145 at a rate of 5 cm/sec to 15 cm/sec, preferably approximately 10 cm/sec.

In addition, the silica-like membrane 105 comprises a two-layer structure that can be divided into a breathable layer 105A with crosslink structure and a selecting layer 105B with silica-like structure, which is directly derived from the breathable layer 105A. The thickness of forming of the selecting layer 105B series with the plasma energy of the atmospheric pressure high temperature plasma torch (APHTPT) 200 can be proportional, when the plasma energy is higher, the thickness of the breathable layer 105A of the surface of the polysilane membrane 145 also is increased. Wherein, the thickness of the selecting layer 105B is higher, the gas selectivity is better.

According to a second embodiment of the present invention, refer to FIGS. 2 and 3, a pre-polymer solution is provided. A pre-polymer solution comprises polydimethylsiloxane (PDMS) of silicon rubber. Polyhydrosiloxane of the cross-linking agent and the platinum catalyst, wherein the cross-linking agent content is about 1~30 phr, preferably by 30 phr (parts per hundred of Rubber) and catalyst content is about 0.1~1 phr, preferably by 1 phr (parts per hundred of Rubber). At the state of the water ice bath, the pre-polymer solution was uniformly stirred, it takes about 20 minutes. Then it is degased about 20 minutes to form an intermediate polymer solution. Subsequently, it is coated onto a Teflon plate to form a coating membrane with the coating knife, which can adjust the thickness of the coated membrane. The thickness of the coated membrane with the coating knife is preferably by 600 μm. Then polymerization of the coating membrane is formed the polydimethylsiloxane (PDMS) membrane at 120° C. and 15 minutes and about 200 to 400 μm, preferably by 400 μm.

Figure 4:
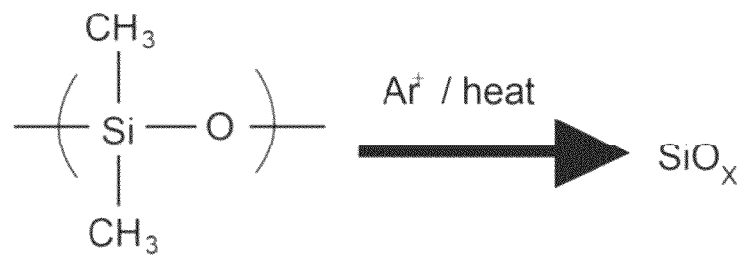
FIG. 4 shows the structural change on the surface of the APHTPT-treated PDMS membrane according to a fourth embodiment of the present invention.
Figure 5:
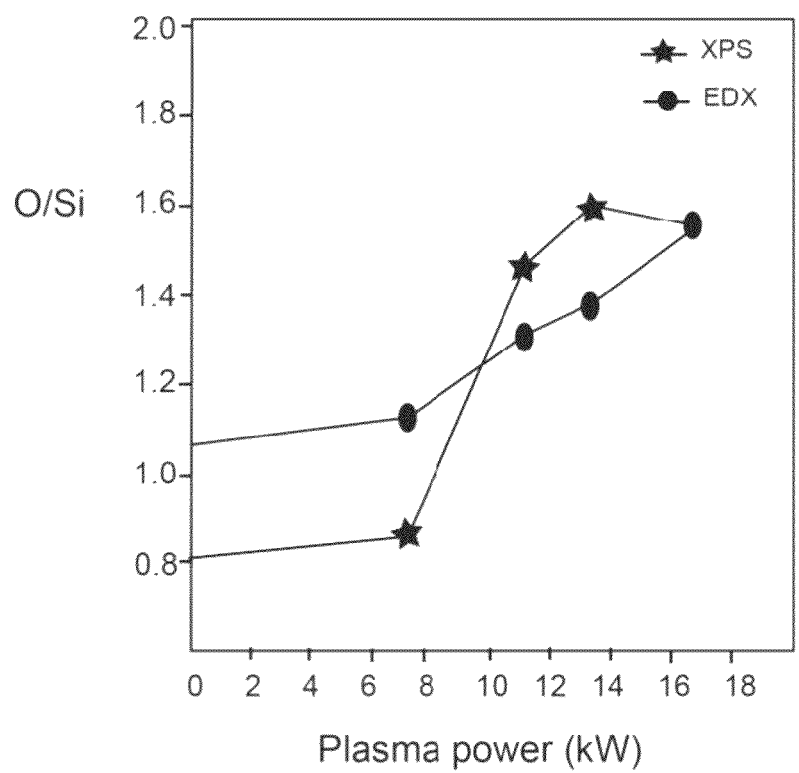
FIG. 5 shows it is measured by X-ray photoelectron spectroscopy (XPS) and energy-dispersive X-ray (EDX) microanalysis to the oxygen/silicon ratio in the chemical structure of the membrane surface of the polydimethylsiloxane (PDMS) with such ions can increase the trend, according to a first embodiment of the present invention.

Subsequently, a plasma polymerization process modifies the surface of the membrane of the polydimethylsiloxane (PDMS) by the atmospheric pressure high temperature plasma torch (APHTPT) 200 to form the silica-like membrane for separating gas. It is the chemical changes in surface structure of the membrane of polydimethylsiloxane(PDMS) by the plasma polymerization process, such as shown FIG. 4, which represents the portion of the siloxane in Ar+ and hot to be modified into the silica-like structure. Wherein, above the modified surface of the polysilane membrane 145 is separated with the gunpoint of the atmospheric pressure high temperature plasma torch (APHTPT) 200 by a work distance d which is about 5~15 cm, more preferably of about 10 cm and the above plasma energy can be approximately in the range of 7 to 15 kW, preferably of approximately 10 kW; and the gunpoint of the atmospheric pressure high temperature plasma torch (APHTPT) 200 scans the surface of the polysilane membrane 145 with a rate, which is 5 cm/sec to 15 cm/sec, preferably about 10 cm/sec. Reference FIG. 5 shown, where it is measured by X-ray photoelectron spectroscopy (XPS) and energy-dispersive X-ray (EDX) microanalysis to the oxygen/silicon ratio in the chemical structure of the membrane surface of the polydimethylsiloxane (PDMS) with such the plasma energy can increase following the trend, it displays the surface structure of the polydimethylsiloxane (PDMS) membrane after the atmospheric pressure high temperature plasma torch (APHTPT) 200 processing, from the outermost layer to the inner layers derivative out asymmetric structure i.e. the structure layer of silica-like, wherein the theoretical value of the oxygen/silicon ratio of the polydimethyl siloxane (PDMS) is 1.0, but the theoretical value of the oxygen/silicon ratio of the silica-like structure layer is 2.0. In addition, when the above plasma energy is higher, the destruction of siloxane chain is more effective. And it is bound with oxygen to form the silica-like structure. However, it is gradually reduced which the plasma energy permeates into the internal layer of the membrane of the polydimethylsiloxane (PDMS), and therefore it will reduce the extent which is converted into the structure of the silica-like as the membrane depth deeper.

Reference to Table 1, it is based Si2p curve analysis of the composition of the membrane of the chemical polydimethyl polydimethylsiloxane(PDMS), wherein 07polydimethylsiloxane (07PDMS) is representative of an original polydimethylsiloxane(PDMS) membrane in the plasma of 7 kW, the polymerization of silica-like structure of the separating gas membrane, the membrane of the original polydimethylsiloxane(PDMS) having $SiO_2C_2$ or siloxane groups, and other components. But this group is treated to become $SiO_3C_2$ and $SiO_4$ with the atmospheric pressure high temperature plasma torch (APHTPT). For example, the membrane of 07polydimethylsiloxane(07PDMS), $SiO_2C_2$ of 23% becomes into $SiO_3C_2$ and $SiO_4$; for example, the membrane of 10polydimethylsiloxane(10PDMS), $SiO_2C_2$ of 92% becomes into $SiO_3C_2$ and $SiO_4$. Accordingly, it is treated to produce the containing $SiO_4$ of 70% for the silica-like structure of the separating gas membrane with the plasma energy of the 10 kilowatts; when the plasma energy is higher than 12 kW, the $SiO_2C_2$ will be completely conversed into $SiO_3C_2$ and $SiO_4$. The above results are demonstrated that when the plasma energy is higher than 10 kilowatts, a derivative of the structure of silica-like is formed in the surface layer of the membrane of the polydimethylsiloxane(PDMS), so when the plasma energy is higher, the thickness of the derived layer of the silica-like structure is more, i.e., when the plasma energy increases, it will increase the siloxane is converted to $SiO_4$. For example, 15 kilowatts can be converted to 90%. Therefore, the present invention may be by adjusting the atmospheric pressure high temperature plasma torch (APHTPT) of energy to form the different proportion of silica-like structure membrane.

Figure 6:
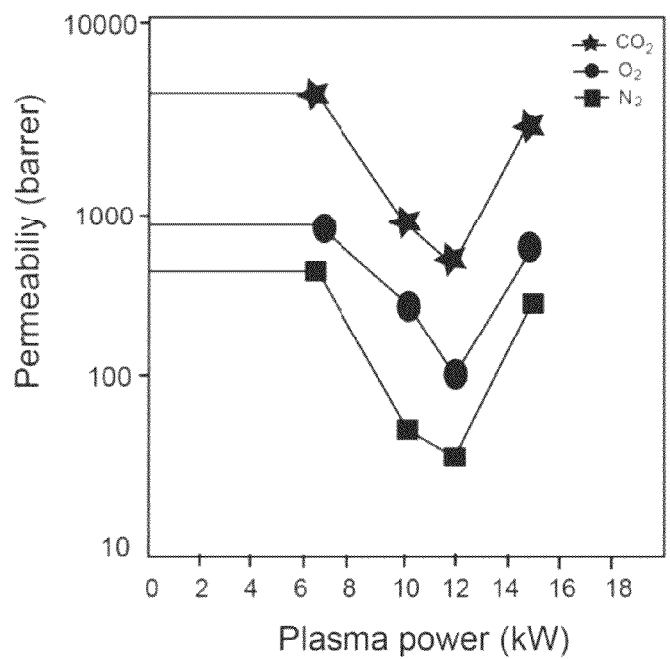
FIG. 6 shows the effect of the plasma power on the gas permeability according to a second embodiment of the present invention.
Figure 7:
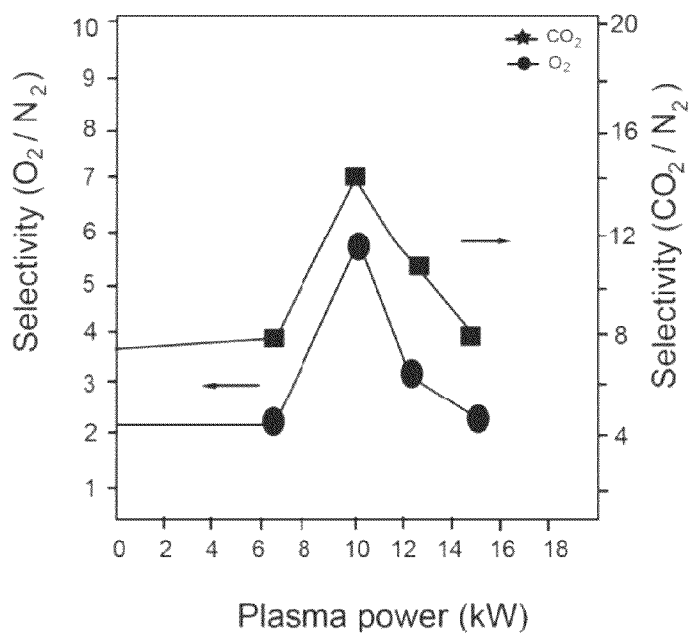
FIG. 7 shows the effect of the plasma power on the selectivity according to a second embodiment of the present invention.

Refer to FIGS. 6 and 7 shown, respectively, show the permeability and the selectivity of the membrane of the polydimethylsiloxane(PDMS) for gas. It is not affected significantly that the permeability and selectivity of the separating gas membrane for the two gases ($O_2/N_2$, $CO_2/N_2$), when the silica-like structure is formed at lower the plasma energy than 7 kilowatts, this result indicates that the silica-like structure cannot be derived on the membrane surface, when the plasma energy is inadequate. In FIG. 2 shows the permeability of all the tests by the plasma energy is higher than 7 kilowatts which formed the separating gas membrane of the structure of the silica-like. It is significantly reduced in the range of 7 kW to 12 kW, and increased in the range of 12 to 15 kW. The other hand, the FIG. 3 shows the selectivity of the gas is significantly increased in the range of 7 kW to 12 kW, and reduced in the range of 12 to 15 kW. The FIGS. 2 and 3 shows an opposite trend, which demonstrates the inversely proportional phenomena between the permeability and selectivity, wherein the maximum selectivity is at the plasma energy of 10 kW. The selectivity of the membrane of 10polydimethylsiloxane (10PDMS) for gas $CO_2/N_2$ and $O_2/N_2$ is 17.19 and 4.93, respectively. After treated by the atmospheric pressure high temperature plasma torch (APHTPT), it may occur linear siloxane part to become the crosslinked network path of the silica-like, as shown in Table 1. This morphology limits the movement of the polymer molecular chain to form a small free volume and the dense structure. Therefore, there are larger obstacles for the diffusion of macromolecules, so as to its higher diffusion selectivity, but it will reduce the permeability.

Figure 8:
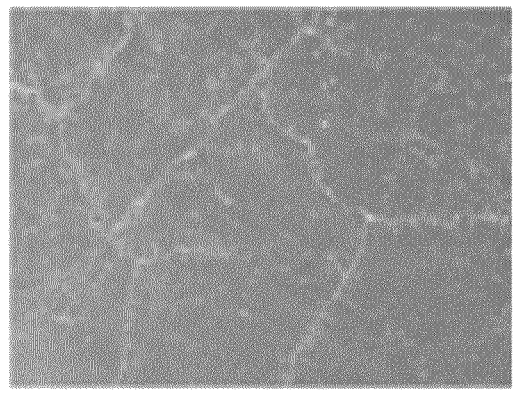
FIG. 8 shows SEM images (×200) of surface morphology of PDMS membrane according to a second embodiment of the present invention.
Figure 9:
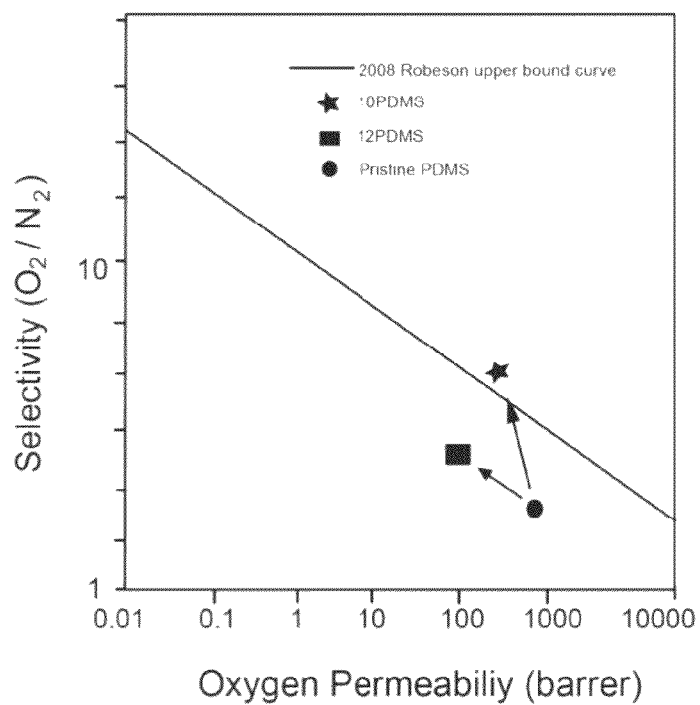
FIG. 9 shows The gas separation performance of the PDMS membranes as referred to the 2008 Robeson upper bound ($O_2/N_2$) curve according to a second embodiment of the present invention.

When the plasma energy is from 12 to 15 kW, the permeability is increased and selectivity is reduced, this can be explained by SEM image, such as the FIG. 8 shows the morphology membrane of 15polydimethylthesiloxane (15PDMS) are cracks in the surface, this state can be attributed to the embrittlement of the silica-like structure; when the content of the silica-like becomes more, the structure of the membrane also becomes brittler, the cracks will open more channels for gas permeation, but lead to the reduction of the selectivity. According to the FIGS. 6 and 7 shown the membrane of 10polydimethylsiloxane (10PDMS) provides optimum selectivity and appropriate permeability. Table 1 shows the surface of the membrane of 10polydimethylsiloxane (10PDMS) has a organic/inorganic hybrid structure which contains the $SiO_2C_2$ of 8%, and $SiO_3C_2$ of 22% and $SiO_4$ of 70%, this organic/inorganic hybrid structure can provide a high permeability and a high selectivity. FIG. 9 plots the 2008 Robeson upper bound curve for $O_2/N_2$; it shows the remarkable separating gas performance of the 10PDMS membrane, which is indicated by a point represented as a star above the 2008 Robeson upper bound curve. Moreover, to increase excessively the plasma energy will cause the polymerization of polysiloxane is formed densely $SiO_x$ network, and the destruction of the polysiloxane chain, also lead to a defect of the membrane. Thus it is reduced the total amount of the small size of the holes, while it is increased the total amount of the large size of the holes. When the plasma energy is increased from 10 kilowatts to 12 kW, the membrane of 10 polydimethylsiloxane (10PDMS) having more the selectivity holes than 12 polydimethylsiloxane (PDMS), that is, when the plasma energy is higher than 10 kW, the $SiO_2C_2$ group within the polydimethylsiloxane (PDMS) polymer chain becomes completely the network of $SiO_3C_2$ and $SiO_4$, to form the silica-like structure.

It is apparent that based on the above descriptions of the embodiments, the present invention can have numerous modifications and alterations, and they should be construed within the scope of the following claims. In addition to the above detailed descriptions, the present invention can be widely applied to other embodiments. The above embodiments are merely preferred embodiments of the present invention, and should not be used to limit the present invention in any way. Equivalent modifications or changes can be made by those with ordinary skill in the art without departing from the scope of the present invention as defined in the following appended claims.

What is claimed is:

1. A method for forming a membrane for separating gas, comprising:
   providing a membrane of polysilane; and
   performing a polymerization process on said membrane of polysilane to form said membrane, wherein said membrane comprises a layer which comprises $SiO_2C_2$ and a siloxane group, and a second layer which comprises $SiO_3C_2$ and $SiO_4$, wherein the second layer is derived from the layer which comprises $SiO_2C_2$ and the siloxane group by said polymerization process.

2. The method for forming a membrane of claim 1, wherein said polymerization process is a plasma polymerization process performed by an atmospheric pressure high temperature plasma torch (APHTPT) which of the plasma power is from 7 kW~15 kW.

3. The method for forming a membrane of claim 2, wherein said membrane of polysilane is distanced from said atmospheric pressure high temperature plasma torch (APHTPT) by 5~15 cm.

4. The method for forming a membrane of claim 2, wherein said atmospheric pressure high temperature plasma torch (APHTPT) operates at a rate between 5 cm/sec to 15 cm/sec.

5. The method for forming a membrane of claim 1, wherein said polysilane further comprises a polydimethylsiloxane(PDMS).

6. A method for forming a membrane for separating gas, comprising:
   forming a membrane of polysilane; and
   performing a polymerization process on said membrane of polysilane to form said membrane, wherein said membrane comprises a layer which comprises $SiO_2C_2$ and a siloxane group, and a second layer which comprises $SiO_3C_2$ and $SiO_4$, wherein the second layer is derived from the layer which comprises $SiO_2C_2$ and the siloxane group by said polymerization process.

7. The method for forming a membrane of claim 6, wherein the membrane of polysilane is formed by performing a polymerization of
   a feed selected from the group consisting of POLYSILOXANE, POLYCARBOSILANE polydimethylsiloxane(PDMS) and combinations thereof
   by a cross-linking agent and a catalyst at 100 to 160° C. for 10~30 minutes.

8. The method for forming a membrane of claim 7 where said cross-linking agent is selected from the group consisting of: 1,3,5-trimethyltrivinylcyclotrisiloxane, Tetramethyltetravinylcyclotetrasiloxane, Decamethylcyclopentasiloxane, 2,4,6,8-tetramethylcyclotetrasiloxane, and combinations thereof.

9. The method for forming a membrane of claim 7, wherein said catalyst is titanium-2-ethylhexoxide.

10. The method for forming a membrane of claim 6, wherein said polymerization process is a plasma polymerization performed by an atmospheric pressure high temperature plasma torch (APHTPT).

11. The method for forming a membrane of claim 10, wherein said atmospheric pressure high temperature plasma torch is distanced from said membrane of polysilane by about 5~15 cm, a plasma power of said atmospheric pressure high temperature plasma torch (APHTPT) is from 7 to 15 kW, and a scan rate of said atmospheric pressure high temperature plasma torch (APHTPT) is about 5~15 cm/sec.

* * * * *